(12) United States Patent
Lin et al.

(10) Patent No.: US 9,629,043 B2
(45) Date of Patent: *Apr. 18, 2017

(54) WIRELESS MESSAGING METHOD AND MOBILE STATION

(71) Applicant: MEDIATEK INC., Hsin-Chu (TW)

(72) Inventors: Keng-Chung Lin, Taipei (TW);
Zong-Ying Tsai, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/754,707

(22) Filed: Jun. 30, 2015

(65) Prior Publication Data

US 2015/0304912 A1    Oct. 22, 2015

Related U.S. Application Data

(63) Continuation of application No. 12/685,665, filed on Jan. 11, 2010, now Pat. No. 9,100,885.

(51) Int. Cl.
| | |
|---|---|
| *H04W 36/02* | (2009.01) |
| *H04W 4/14* | (2009.01) |
| *H04B 3/46* | (2015.01) |
| *H04W 36/16* | (2009.01) |
| *H04W 88/02* | (2009.01) |
| *H04W 88/08* | (2009.01) |

(52) U.S. Cl.
CPC .............. *H04W 36/02* (2013.01); *H04B 3/46* (2013.01); *H04W 4/14* (2013.01); *H04W 36/16* (2013.01); *H04W 88/02* (2013.01); *H04W 88/08* (2013.01)

(58) Field of Classification Search
CPC .................................................... H04W 36/02
See application file for complete search history.

(56) References Cited

U.S. PATENT DOCUMENTS

| | | | |
|---|---|---|---|
| 5,677,908 | A | 10/1997 | Oura |
| 6,438,114 | B1 | 8/2002 | Womack |
| 6,564,057 | B1 | 5/2003 | Chun |
| 7,027,816 | B2 | 4/2006 | Kikuma |
| 7,315,741 | B2 | 1/2008 | Chun |
| 7,596,378 | B1 | 9/2009 | Nizri |
| 8,005,478 | B2 | 8/2011 | Song |
| 8,285,289 | B2 | 10/2012 | Mooney |
| 2005/0208945 | A1 | 9/2005 | Hong |

(Continued)

FOREIGN PATENT DOCUMENTS

| | | |
|---|---|---|
| CN | 1864362 A | 11/2006 |
| CN | 101060719 A | 10/2007 |

(Continued)

OTHER PUBLICATIONS

Digital cellular telecommunications system (Phase 2+); Universal Mobile Telecommunications System (UMTS); Point-to-Point (PP) Short Message Service (SMS) Support on Mobile Radio Interface (3GPP TS 24.011 version 5.0.0 Release 5), pp. 1-105, Jun. 2002.

*Primary Examiner* — Michael T Vu (74) *Attorney, Agent, or Firm* — Winston Hsu; Scott Margo (57) ABSTRACT

A wireless messaging method includes the steps of: when a mobile station is transmitting a message to a network and a first handover occurs, evaluating network conditions to generate an indication signal; and re-transmitting the message according to the indication signal.

18 Claims, 7 Drawing Sheets

(56) References Cited

U.S. PATENT DOCUMENTS

| | | |
|---|---|---|
| 2007/0106924 A1 | 5/2007 | Seidel |
| 2007/0243889 A1 | 10/2007 | Choi |
| 2008/0247358 A1 | 10/2008 | Damnjanovic |
| 2009/0111468 A1* | 4/2009 | Burgess ............... H04W 36/14 455/436 |
| 2010/0130217 A1 | 5/2010 | Wu |
| 2011/0105132 A1* | 5/2011 | Vasudevan ............ H04W 48/16 455/448 |

FOREIGN PATENT DOCUMENTS

| | | |
|---|---|---|
| EP | 0 544 447 A2 | 6/1993 |
| EP | 0802691 A2 | 10/1997 |
| EP | 1 848 227 A1 | 10/2007 |
| EP | 1 868 311 A1 | 12/2007 |
| WO | 9316562 A1 | 8/1993 |
| WO | 9837717 A1 | 8/1998 |
| WO | 03055240 A1 | 7/2003 |
| WO | 2005018256 A1 | 2/2005 |

* cited by examiner

WIRELESS MESSAGING METHOD AND MOBILE STATION

CROSS REFERENCE TO RELATED APPLICATION

This continuation application claims the benefit of U.S. application Ser. No. 12/685,665, which was filed on Jan. 11, 2010.

BACKGROUND

The present invention relates to a wireless messaging method and a mobile station implementing the wireless messaging method, and more particularly to a wireless messaging method for transmitting data according to network conditions.

The Short Message Service (SMS) allows messages to be exchanged between mobile users and to be broadcasted to all mobile users in a specified geographical area. Messages are sent to a Short Message Service Centre (SMSC) which provides a store-and-forward mechanism. If a recipient of a message is not reachable, the SMSC queues the message for later retry. An SMS message is sent segment by segment due to the capability of the radio resource management (RR) layer. When a mobile station starts sending a message to the SMSC through a base station and a handover occurs, the mobile station will stop sending and the network will discard the sent segments of the message. At the same time, the mobile station starts a timer to count until reaching a predetermined time (e.g., 14~21 seconds, this timer value is not defined in the specifications 3GPP TS 24.011 version 5.0.0 Release 5 nor 3GPP TS 51.010-1 version 5.0.0 Release 5). When the predetermined time is up, the mobile station will resend the whole message to a new base station. When the mobile station resends the message to this new base station and another handover occurs, the mobile station again terminates the message sending and retry after counting to the predetermined time. If it is determined that the message sending process has failed a few times, it will stop sending the message and report the failure notification to the user.

Furthermore, when the mobile station receives a message from the SMSC through the base station and a handover occurs before the mobile station transmits an acknowledgment signal of the received message, the network may try to resend the message to the mobile station since the acknowledgment signal from the mobile station was not received. Consequently, the mobile station will repeatedly receive the same message.

SUMMARY

One of the objectives of the present invention is to provide a wireless messaging method for transmitting data according to network conditions.

According to a first embodiment of the present invention, a wireless messaging method is disclosed. The wireless messaging method comprises the steps of: when a mobile station is transmitting a message to a network and a first handover occurs, evaluating network conditions to generate an indication signal; and re-transmitting the message according to the indication signal.

According to a second embodiment of the present invention, a wireless messaging method is disclosed. The wireless messaging method comprises the steps of: when a mobile station receives a message from a network and a first handover occurs before the mobile station successfully transmits an acknowledgment signal of the received message, evaluating network conditions to generate an indication signal; and transmitting the acknowledgment signal according to the indication signal.

According to a third embodiment of the present invention, a mobile station is disclosed. The mobile station comprises a transceiver, a radio resource management sublayer, and a short message call management sublayer. The transceiver is arranged for transmitting and receiving signals. The radio resource management sublayer is arranged for evaluating network conditions to generate an indication signal when the transceiver is transmitting a message while a first handover occurs. The short message call management sublayer is arranged for directing the transceiver to re-transmit the message according to the indication signal generated in the radio resource management sublayer.

According to a fourth embodiment of the present invention, a mobile station is disclosed. The mobile station comprises a transceiver, a radio resource management sublayer, and a short message call management sublayer. The transceiver is arranged for transmitting and receiving communication signals. The radio resource management sublayer is arranged for evaluating network conditions to generate an indication signal when the transceiver receives a message and a first handover occurs before the transceiver transmits an acknowledgment signal of the received message. The short message call management sublayer is arranged for directing the transceiver to transmit the acknowledgment signal according to the indication signal generated by the radio resource management sublayer.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

In this document, the terminologies used are for GSM (Global System for Mobile) network system, such as mobile station and base station; however, this invention shall not be limited to GSM network system. The wireless messaging method and handheld devices implementing the method of the present invention can be applied in other network systems such as UMTS (Universal Mobile Telecommunication system) and LTE (Long Term Evolution). The mobile station thus represents any handheld devices with a transceiver capable of communicating with a wireless network, and the base station represents any wireless communication station in the wireless network such as Node B or eNode B.

Figure 1:
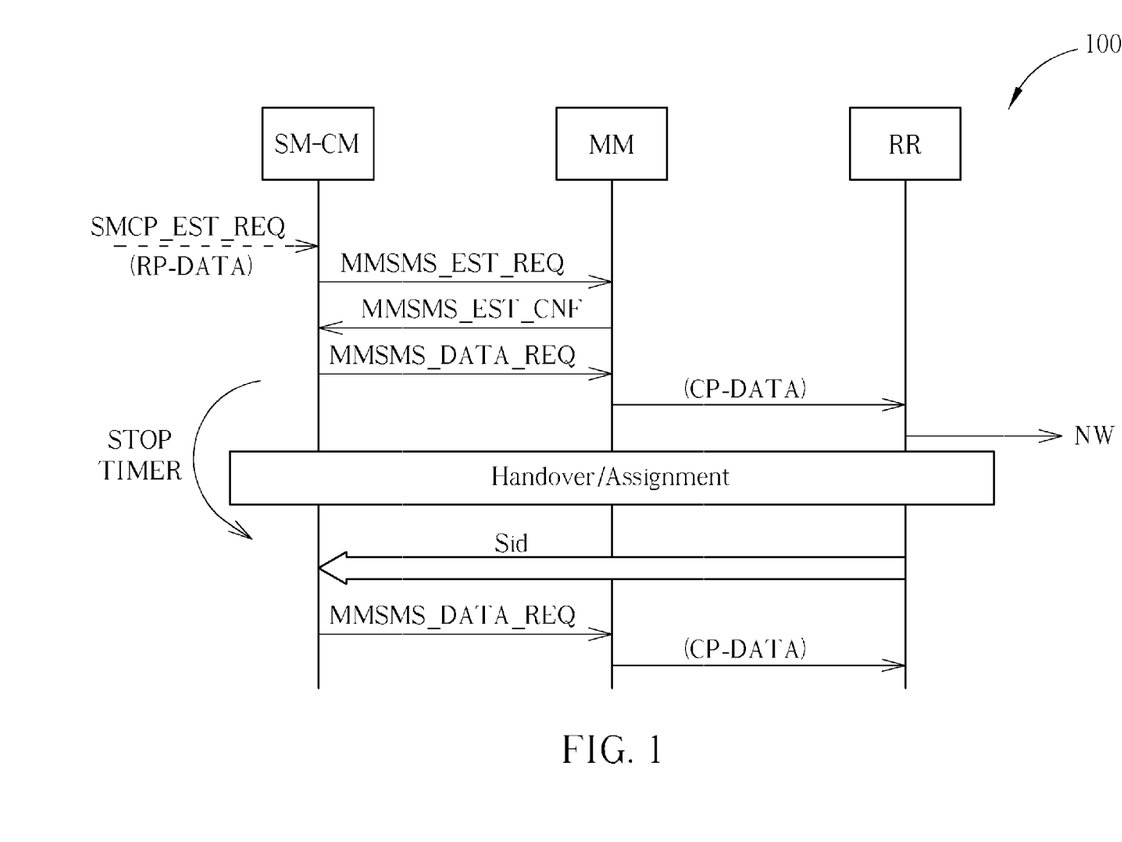
FIG. 1 is a diagram illustrating a wireless messaging method according to a first embodiment of the present invention.

Please refer to FIG. 1. FIG. 1 is a diagram illustrating a wireless messaging method 100 according to an embodiment of the present invention. In this embodiment, the wireless messaging method 100 is employed in a mobile station, and the wireless messaging method 100 is a mobile originating (MO) case. The third layer of the GSM network communication protocol is divided into sublayers, including CM (Call Management), MM (Mobility Management), and RR (Radio Resource Management). Sublayers are responsible for different functions. To perform a function supported by the GSM network, such as making a phone call or sending an SMS message, an upper sublayer issues a command to inform a lower sublayer to transmit signals accordingly. RR sublayer is responsible for maintaining connections between the mobile station and Base Station Controller (BSC) and establishing or releasing of communication channels, and it is also responsible for radio management such as power control, discontinuous transmission, timing advance for signal transmission, and handover. MM sublayer is responsible for mobility management so that the current location of the mobile station is known to the GSM network, it is also responsible for authentication and ciphering. CM sublayer is responsible for call control, such as establishing or release of a call, and selection of voice or fax communication. CM is also responsible for supplementary service (SS) management and SMS management. As shown in FIG. 1, SM-CM is the CM sublayer responsible for SMS management.

According to the wireless messaging method 100, the RR sublayer evaluates network conditions of the mobile station to generate an indication Sid when an SMS message transmission is failed due to an event such as handover or assignment. The SM-CM sublayer issues a command to request for message re-transmission according to the indication Sid.

In FIG. 1, the SM-CM sublayer receives a request (i.e., SMCP_EST_REQ) when the user wishes to send a message (i.e., RP-DATA) through the network. The SM-CM sublayer sends a short-message-establish request (MMSMS_EST_REQ) to the MM sublayer. Then, the MM replies with a confirmation (i.e., MMSMS_EST_CNF) to the SM-CM sublayer if the connection is established. When the SM-CM sublayer receives the MMSMS_EST_CNF, the SM-CM sublayer sends a data request (i.e., MMSMS_DATA_REQ) to the MM sublayer in order to request the MM sublayer to send CP-DATA on the established connection. Then, the MM sublayer transfers the CP-DATA to the RR sublayer, and the RR sublayer transmits the message to the network by radio signal.

When the RR sublayer transmits the message to the SMSC through a base station and a first handover occurs, the RR sublayer terminates the message transmission. Then, the RR sublayer evaluates network conditions of the mobile station to generate the indication Sid to the SM-CM sublayer. For example, when the first handover is complete, the RR sublayer evaluates the network conditions between the mobile station and the base station to determine if the network conditions are good enough to re-transmit the message. In other words, the RR sublayer evaluates the network conditions between the mobile station and the base station to generate an evaluation result. The RR sublayer generates an indication Sid to the SM-CM sublayer based on the evaluation result. In one embodiment, if the evaluation result indicates that the network conditions are good enough, the RR sublayer sends the indication Sid to the SM-CM sublayer to indicate the SM-CM sublayer can re-transmit the message immediately. Otherwise, the RR sublayer will not generate the indication Sid, and continues to evaluate the network conditions until the network conditions are good enough for re-transmission of the message. Furthermore, the SM-CM sublayer may stop a retry timer when the indication Sid is generated, wherein the retry timer starts counting when the first handover occurs. In another embodiment, the RR sublayer generates an indication Sid indicating the network conditions for the SM-CM sublayer to determine the re-transmission method. For example, the SM-CM sublayer determines whether to re-transmit the message immediately, or to send the message with best effort, or to keep relying on the timer for re-transmission according to the indication Sid. Compared to the related art, the present embodiment re-transmits the terminated message according to the network conditions rather than counting a fixed period by the retry timer.

Figure 2:
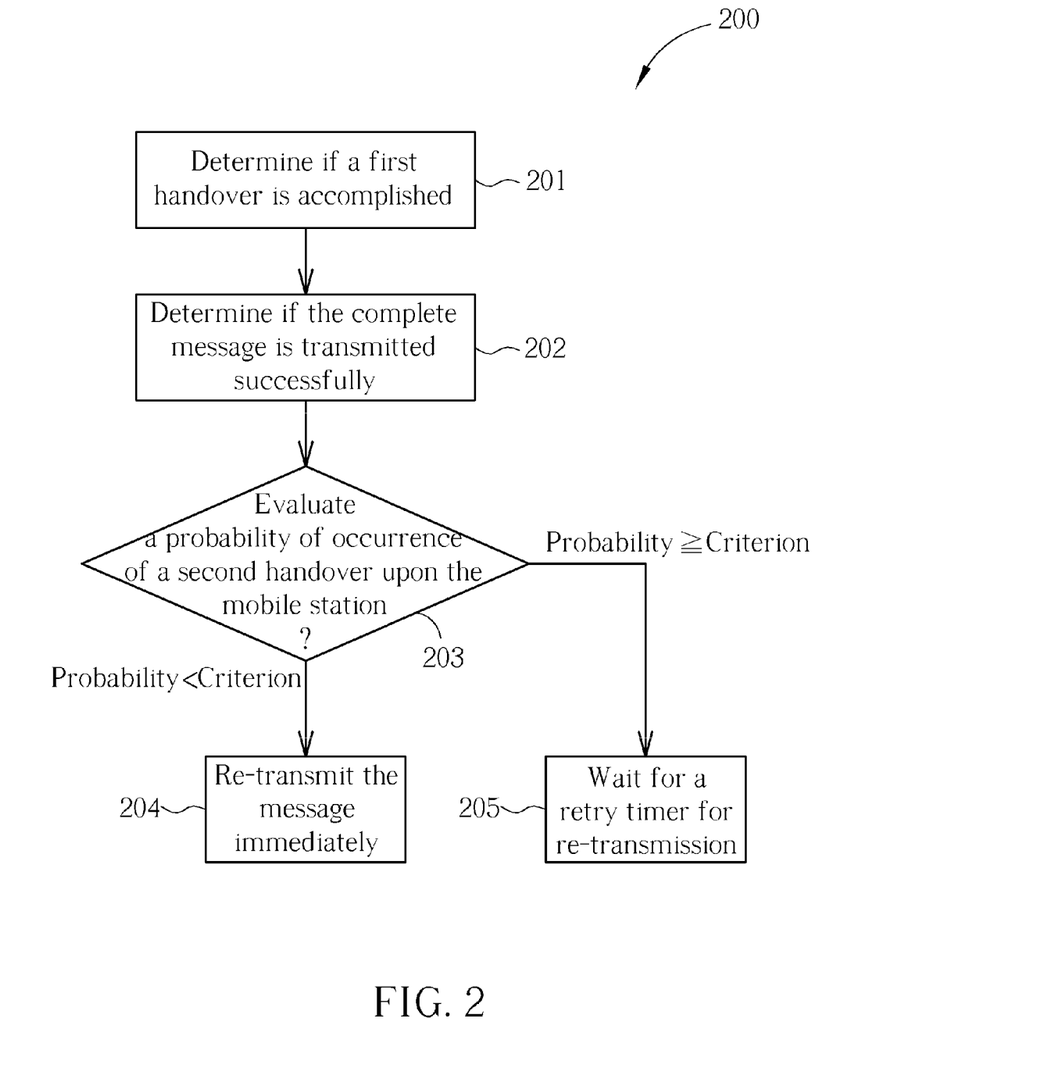
FIG. 2 is a flowchart illustrating a method of evaluating network conditions of a mobile station according to an embodiment of the present invention.

Please refer to FIG. 2. FIG. 2 is a flowchart illustrating a method 200 of evaluating the network conditions of the mobile station to determine whether to re-transmit the message immediately according to an embodiment of the present invention. Provided that substantially the same result is achieved, the steps of the flowchart shown in FIG. 2 need not be in the exact order shown and need not be contiguous; that is, other steps can be intermediate. The method 200 comprises the following steps:

Step 201: Determine if the first handover is accomplished;

Step 202: When the first handover is accomplished, determine if the complete message is transmitted successfully;

Step 203: When the message is not transmitted completely, evaluate a probability of occurrence of a second handover upon the mobile station; if the probability is smaller than a criterion, go to step 204, if the probability is not smaller than the criterion, go to step 205;

Step 204: Re-transmit the message immediately;

Step 205: Wait for a retry timer for re-transmission.

Figure 3:
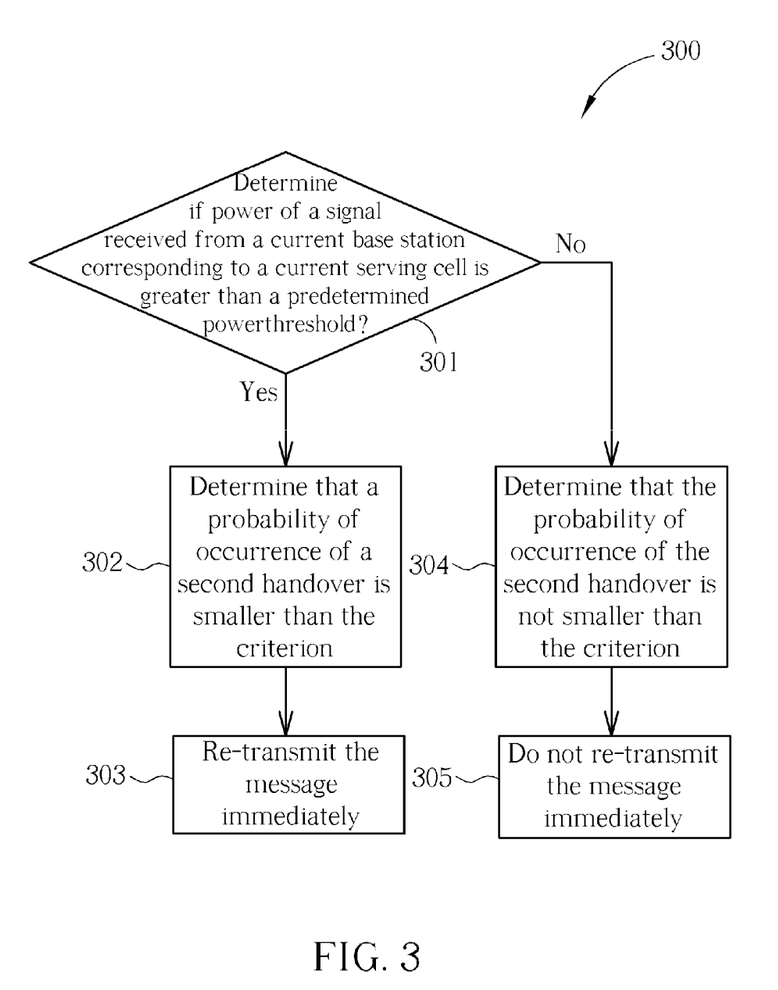
FIG. 3 is a flowchart illustrating a method of determining power of a signal received from the current base station to evaluate the probability of occurrence of a second handover according to an embodiment of the present invention.

When the first handover is accomplished but the message is not transmitted to the base station successfully, the mobile station evaluates the probability of occurrence of a second handover upon the mobile station according to a criterion, wherein the criterion is a predetermined threshold value indicating the probability of the occurrence of the second handover after the first handover. When the probability of occurrence is smaller than the criterion, indicating the path (i.e., the network conditions) between the mobile station and the current base station is relatively stable, the mobile station re-transmits the message immediately. Otherwise, the mobile station does not re-transmit the message immediately. Please note that, according to the embodiments of the present invention, there are several methods for evaluating the network conditions of the mobile station. According to an embodiment, the RR sublayer determines power of a signal received from a current base station to evaluate the probability of occurrence of the second handover as shown in FIG. 3. FIG. 3 is a flowchart illustrating a method 300 of determining the power of the signal received from the current base station to evaluate the probability of occurrence of the second handover according to an embodiment of the present invention. Provided that substantially the same result is achieved, the steps of the flowchart shown in FIG. 3 need not be in the exact order shown and need not be contiguous; that is, other steps can be intermediate. Furthermore, it should be noted that the current serving cell is a serving cell corresponding to the mobile station when the first handover is accomplished. The method 300 comprises the following steps:

Step 301: Determine if the power of the signal received from the current base station corresponding to the current serving cell is greater than a predetermined power threshold; when the power of the signal received from the current base station is greater than the predetermined power threshold, go to step 302, and when the power of the signal received from the current base station is not greater than the predetermined power threshold, go to step 304;

Step 302: Determine that the probability of occurrence of the second handover is smaller than the criterion;

Step 303: Re-transmit the message immediately;

Step 304: Determine that the probability of occurrence of the second handover is not smaller than the criterion;

Step 305: Do not re-transmit the message immediately.

Figure 4:
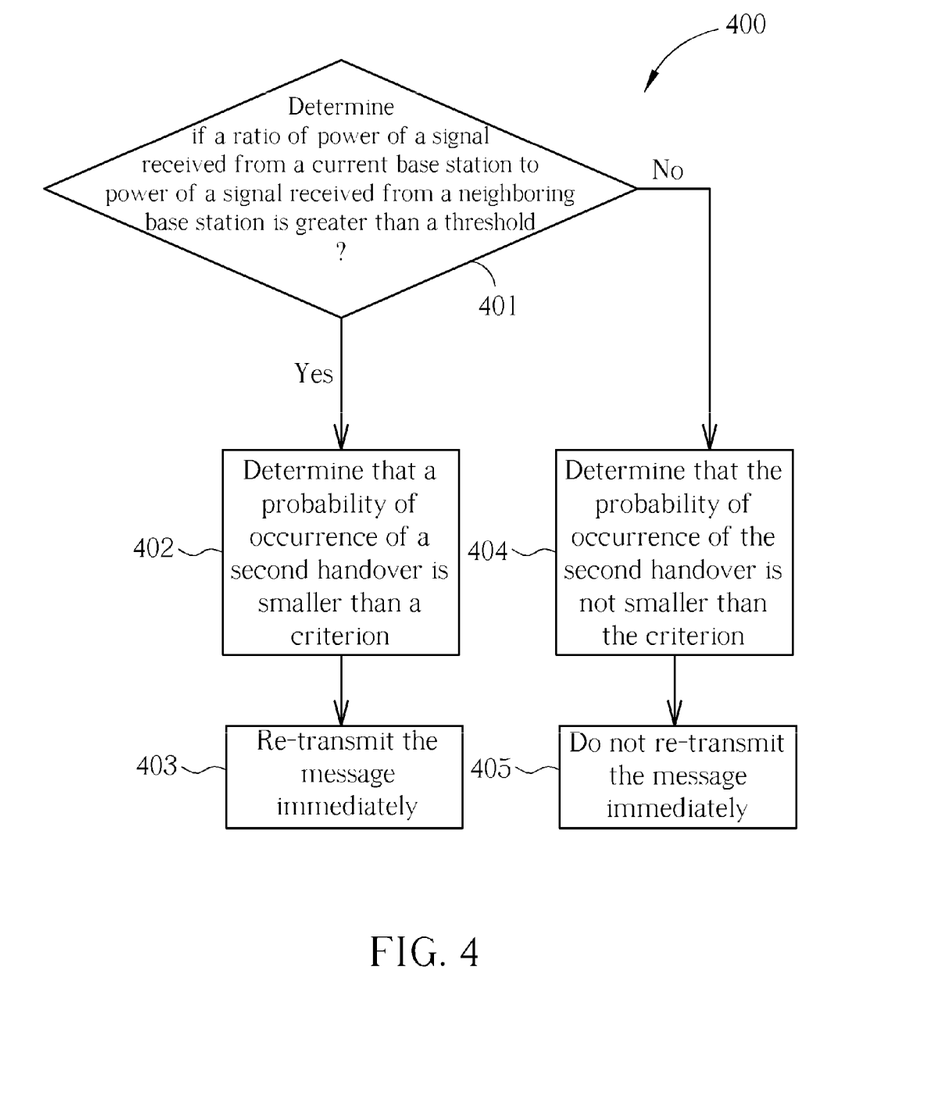
FIG. 4 is a flowchart illustrating a method of comparing powers of the signal received from the current base station and the signal received from a neighboring base station to evaluate the probability of occurrence of a second handover according to an embodiment of the present invention.

When the power of the signal received from the current base station is greater than the predetermined power threshold, this means the mobile station may be close to the current base station, and the network conditions are good enough to re-transmit the message to the current base station. In this case, the mobile station re-transmits the message immediately. Otherwise, the mobile station will not re-transmit the message immediately. According to another embodiment, the RR sublayer compares the power of the signal received from the current base station corresponding to the current serving cell and the power of the signal received from one or more neighboring base station(s) to evaluate the probability of occurrence of the second handover as shown in FIG. 4. FIG. 4 is a flowchart illustrating a method 400 of comparing the ratio of powers of the signal received from the current base station and the neighboring base station to evaluate the probability of occurrence of the second handover according to an embodiment of the present invention. Provided that substantially the same result is achieved, the steps of the flowchart shown in FIG. 4 need not be in the exact order shown and need not be contiguous; that is, other steps can be intermediate. Furthermore, it should be noted that the current serving cell is a serving cell corresponding to the mobile station when the first handover is accomplished. The method 400 comprises the following steps:

Step 401: Determine if a ratio of the power of the signal received from the current base station to the power of the signal received from the neighboring base station is greater than a threshold; when the ratio is greater than the threshold, go to step 402, and when the ratio is not greater than the threshold, go to step 404;

Step 402: Determine that the probability of occurrence of the second handover is smaller than the criterion;

Step 403: Re-transmit the message immediately;

Step 404: Determine that the probability of occurrence of the second handover is not smaller than the criterion;

Step 405: Do not re-transmit the message immediately.

Figure 5:
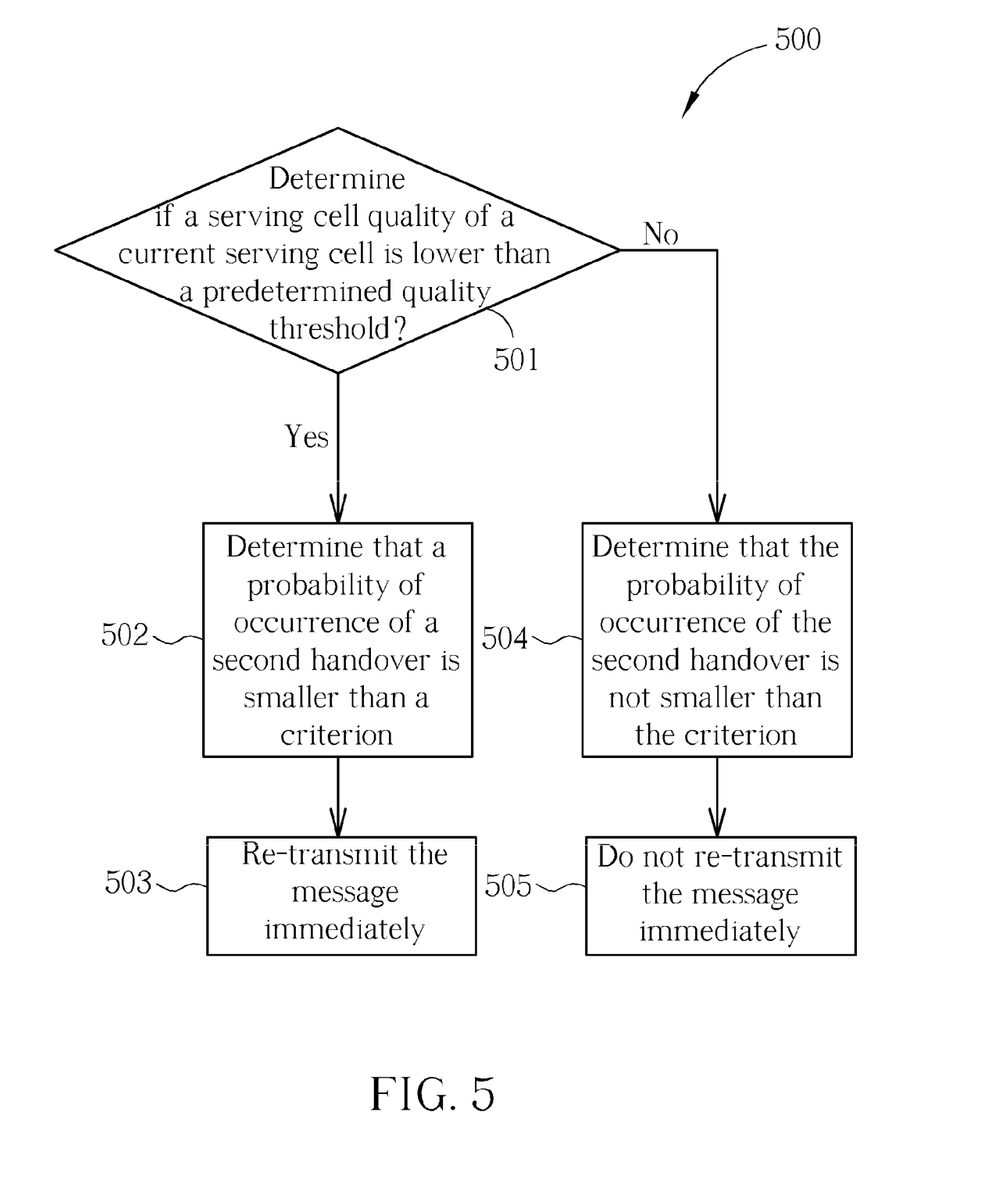
FIG. 5 is a flowchart illustrating a method of determining a serving cell quality of a current serving cell to evaluate the probability of occurrence of a second handover according to an embodiment of the present invention.

Similarly, when the power of the signal received from the current base station is much greater than the power of the signal received from any of the neighboring base stations (e.g., the power of the signal received from the current base station is 10 dB larger than the power of the signal received from the closest neighboring base station), this means the network conditions are good enough to re-transmit the message to the current base station. In this case the RR sublayer generates and sends the indication Sid to the SM-CM sublayer, and the SM-CM determines to re-transmit the message immediately. According to another embodiment, a serving cell quality of the current serving cell is compared to a predetermined quality threshold to evaluate the probability of occurrence of the second handover as shown in FIG. 5. FIG. 5 is a flowchart illustrating a method 500 of determining the serving cell quality of the current serving cell to evaluate the probability of occurrence of the second handover according to an embodiment of the present invention. Provided that substantially the same result is achieved, the steps of the flowchart shown in FIG. 5 need not be in the exact order shown and need not be contiguous; that is, other steps can be intermediate. Furthermore, it should be noted that the current serving cell is a serving cell corresponding to the mobile station when the first handover is accomplished. The method 500 comprises the following steps:

Step 501: Determine if the serving cell quality of the current serving cell is higher than the predetermined quality threshold; when the serving cell quality of the current serving cell is higher than the predetermined quality threshold, go to step 502, and when the serving cell quality of the current serving cell is lower than the predetermined quality threshold, go to step 504;

Step 502: Determine that the probability of occurrence of the second handover is higher than the criterion;

Step 503: Re-transmit the message immediately;

Step 504: Determine that the probability of occurrence of the second handover is smaller than the criterion;

Step 505: Do not re-transmit the message immediately.

When the serving cell quality of the current serving cell is higher than the predetermined quality threshold (e.g., 3), this means the path between the mobile station and the current base station may be relatively clean or stable, and the network conditions are good enough to re-transmit the message to the base station. In this case the RR sublayer generates and sends the indication Sid to the SM-CM sublayer, and the SM-CM sublayer directs the transceiver to re-transmit the message immediately. Beside to the embodiments shown in FIG. 3, FIG. 4, FIG. 5, the mobile station may determine the network conditions by detecting the movement or mobility of the mobile station, for example, by detecting the speed or velocity of the mobile station to judge whether it is stationary, slow movement, or rapid movement. In an embodiment, when the mobile station is judged as stationary, the network conditions are deemed to be stable, and it has a higher probability of success that the currently-re-transmit-message can be delivered to the base station. In this case, the mobile station can re-transmit the message immediately instead of waiting for the retry timer.

Please note that the present invention is not limited to implementing methods 300, 400, 500, and the movement or mobility detection method independently, it is possible to evaluate the network conditions by considering the judgments or evaluation outcomes of more than two kinds of methods. Furthermore, it should be noted that the first handover and the second handover may be one of an intra-cell handover, an inter-cell handover, an external handover, and a channel assignment.

Figure 6:
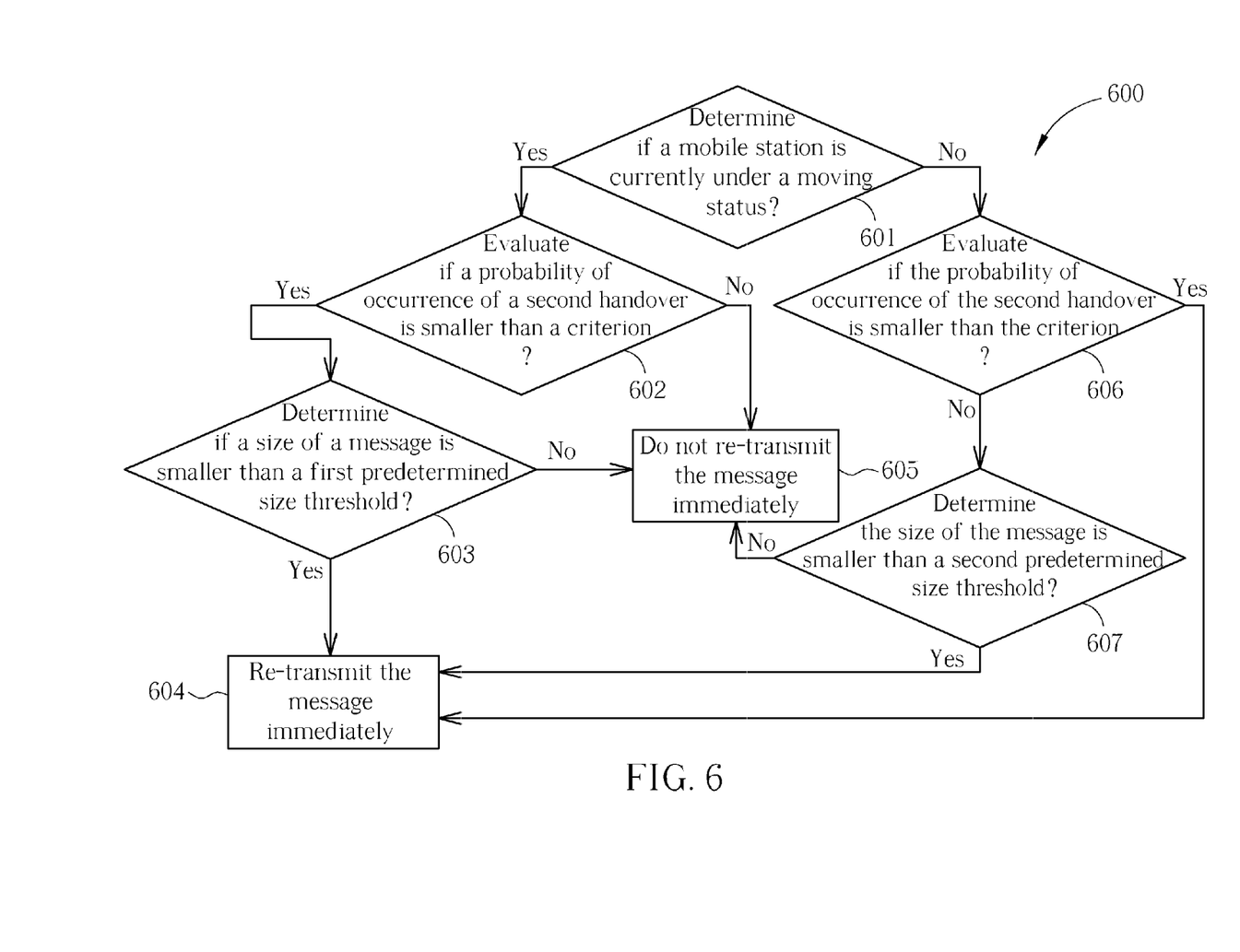
FIG. 6 is a flowchart illustrating a method of evaluating the network condition according to another embodiment of the present invention.

FIG. 6 shows an embodiment of network condition evaluation method 600 considering more than two kinds of judgments or evaluation outcomes. Provided that substantially the same result is achieved, the steps of the flowchart shown in FIG. 6 need not be in the exact order shown and need not be contiguous; that is, other steps can be intermediate. The method 600 comprises the following steps:

Step 601: Determine if the mobile station is currently under a moving status; if yes go to step 602, if no go to step 606;

Step 602: Evaluate the probability of occurrence of the second handover; when the probability of occurrence of the second handover is smaller than the criterion, go to step 603, and when the probability of occurrence of the second handover is not smaller than the criterion, go to step 605;

Step 603: Determine a size of the message; when the size of the message is smaller than a first predetermined size threshold, go to step 604, and when the size of the message is not smaller than the first predetermined size threshold, go to step 605;

Step 604: Re-transmit the message immediately;

Step 605: Do not re-transmit the message immediately;

Step 606: Evaluate the probability of occurrence of the second handover; when the probability of occurrence of the second handover is smaller than the criterion, go to step 604, and when the probability of occurrence of the second handover is not smaller than the criterion, go to step 607;

Step 607: Determine the size of the message; when the size of the message is smaller than a second predetermined size threshold, go to step 604, and when the size of the message is not smaller than the second predetermined size threshold, go to step 605.

In step 601, when the variation of power of the signal received from the current base station and the signal received from the neighboring base station is relatively stable in a predetermined time (e.g., 5 seconds), a first result is generated to indicate that the status of the mobile station is stationary. Otherwise, the first result indicates that the status of the mobile station is moving. In step 602, the above-mentioned methods 300, 400, 500 may be implemented for evaluating the probability of occurrence of the second handover to generate a second result. When the mobile station is under the moving status and the second result indicates that the probability of occurrence of the second handover is lower than the criterion, the indication Sid may indicate the SM-CM sublayer to re-transmit the message with best effort, for example, when the size of the message is smaller than a first predetermined size threshold, the SM-CM directs the transceiver to re-transmit the message immediately.

When the mobile station is under the stationary status (step 606), the above-mentioned methods 300, 400, 500 may be implemented for evaluating the probability of occurrence of the second handover to generate the second result. When the second result indicates that the probability of occurrence of the second handover is lower than the criterion, the RR sublayer generates the indication Sid to the SM-CM sublayer indicating the message can be re-transmitted immediately (step 604). Otherwise, the indication Sid indicates that the message can be transmitted with best effort, for example, mobile station determines the size of the message (step 607), and when the size of the message is smaller than a second predetermined size threshold, the SM-CM sublayer indicating the message can be re-transmitted immediately, and when the size of the message is larger than the second predetermined size threshold, the re-transmission is halted. Normally, the first predetermined size threshold is smaller than the second predetermined size threshold.

Therefore, when the SM-CM sublayer receives the indication Sid indicating the network conditions are good enough, it sends the MMSMS_DATA_REQ to the MM sublayer to request the MM sublayer to send the message (i.e., CP-DATA) again.

Figure 7:
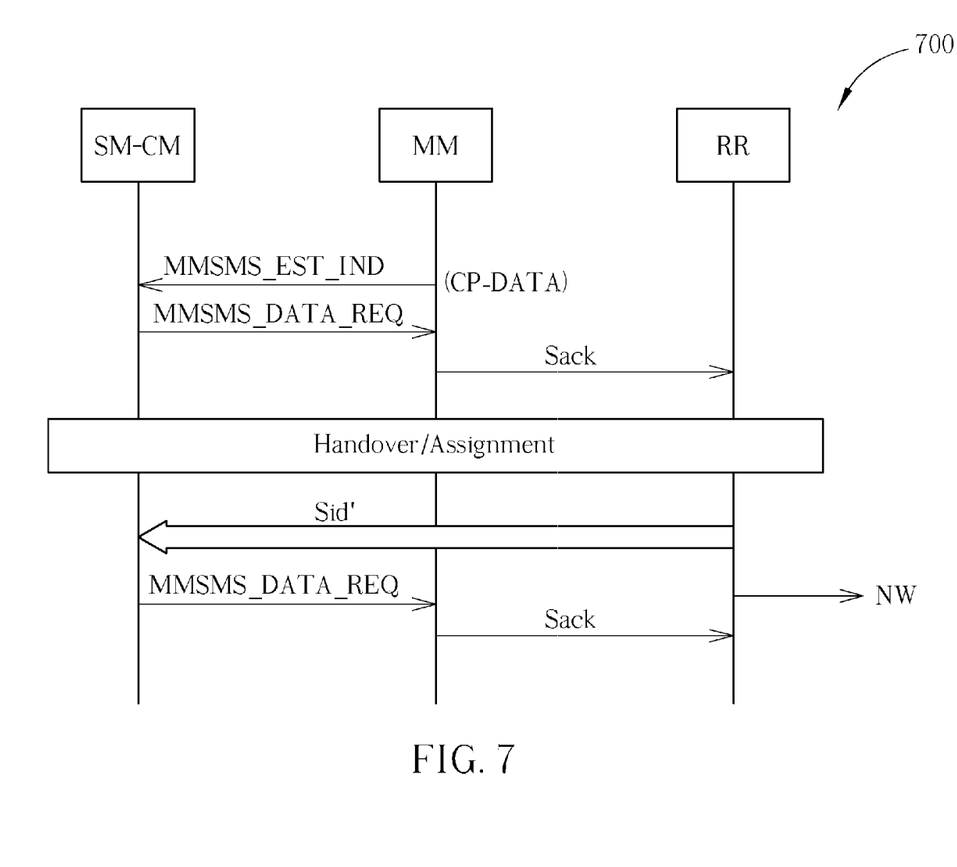
FIG. 7 is a diagram illustrating the wireless messaging method according to a second embodiment of the present invention.

Please refer to FIG. 7. FIG. 7 is a diagram illustrating a wireless messaging method 700 according to another embodiment of the present invention. The wireless messaging method 700 is employed in the mobile station as mentioned in FIG. 1, and the wireless messaging method 700 is a mobile terminating (MT) case. According to the wireless messaging method 700, the RR sublayer evaluates the network NW conditions to generate an indication Sid' when the mobile station receives a message and a first handover occurs before the mobile station transmits an acknowledgment signal Sack of the received message to the SMSC through a base station. The SM-CM sublayer transmits the acknowledgment signal Sack to the base station according to the indication Sid'.

In FIG. 7, when the SM-CM sublayer receives an indication (i.e., MMSMS_EST_IND) from the MM sublayer, the MMSMS_EST_IND indicates to the SM-CM sublayer that the message (i.e., RP-DATA) from the base station is complete. Then, the SM-CM sublayer sends the short-message-establish request (MMSMS_EST_REQ) to the MM sublayer, in which the MMSMS_EST_REQ contains the acknowledgment signal Sack (i.e., CP-ACK). Then, the MM sublayer transfers the acknowledgment signal Sack to the RR sublayer, and the MM sublayer transmits the acknowledgment signal Sack to the network NW by a radio signal.

When the RR sublayer transmits the acknowledgment signal Sack to the base station and the first handover occurs, the RR sublayer terminates the transmission. Then, the RR sublayer evaluates network conditions to generate the indication Sid' to the SM-CM sublayer. More specifically, when the first handover is over, the RR sublayer evaluates the network conditions to determine if the network conditions are good enough to re-transmit the acknowledgment signal Sack. In other words, the RR sublayer evaluates the network conditions to generate an evaluation result. In one embodiment, the RR sublayer selectively generates the indication Sid' to the SM-CM sublayer according to the network conditions. If the evaluation result indicates that the network conditions are good enough, the RR sublayer sends the indication Sid' to the SM-CM sublayer to indicate the SM-CM sublayer to re-transmit the terminated acknowledgment signal Sack. Otherwise, the RR sublayer will not generate the indication Sid', and continues to evaluate the network conditions until the network conditions are good enough for re-transmitting the acknowledgment signal Sack. In another embodiment, the RR sublayer forwards the network conditions by the indication Sid' to the SM-CM sublayer, and the SM-CM sublayer determines whether to transmit the acknowledgement immediately or to wait till the retry timer expired. Similar to the wireless messaging method 100, the method 200 shown in FIG. 2 may be implemented for evaluating the network conditions of the mobile station to determine the re-transmission timing. Furthermore, the methods 300, 400, 500 shown in FIGS. 3, 4, 5, respectively, may be utilized for evaluating the probability of occurrence of a second handover upon the mobile station when the acknowledgment signal Sack is not successfully transmitted to the base station. Please note that those skilled in this art will readily understand the operation of the wireless messaging method 700 after reading the disclosure related to the wireless messaging method 100, thus the detailed description is omitted here for brevity. When the short message service SMS receives the indication Sid', the SM-CM sublayer sends the MMSMS_DATA_REQ to the MM sublayer to request the MM sublayer to send the acknowledgment signal Sack again.

Briefly, the conventional art may miss the opportunity to re-transmit the message and the acknowledgment signal Sack as it only relies on a retry timer and re-transmits after a predetermined period. However, by utilizing the wireless messaging methods 100 and 700, the mobile station re-transmits the message and the acknowledgment signal Sack right after the first handover is over if the network conditions are determined good enough for transmission. Therefore, the present mobile station possesses high efficiency of transmitting/receiving a message from the SMSC through a base station.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless messaging method, comprising:
    evaluating network conditions between a mobile station and a base station to generate an indication signal after a first handover is completed when a message is transmitted unsuccessfully during the first handover;
    re-transmitting the message according to the indication signal, wherein the step of re-transmitting the message according to the indication signal, comprises:
    evaluating a probability of occurrence of a second handover according to the indication signal when the message is not transmitted successfully; and
    re-transmitting the message according to the probability of occurrence of the second handover.

2. The method of claim 1, wherein the step of evaluating the network conditions to generate the indication comprises:
    evaluating the network conditions in a radio resource management sublayer to generate an evaluation result; and
    referring to the evaluation result for generating the indication signal to a short message service call management sublayer.

3. The method of claim 1, wherein the first handover is one of an intra-cell handover, an inter-cell handover, an external handover, and a channel assignment.

4. The method of claim 1, further comprising:
    stopping a timer according to the indication signal;
    wherein the timer starts counting when the first handover occurs.

5. The method of claim 1, wherein when the first handover is accomplished, the step of evaluating the probability of occurrence of the second handover comprises:
    determining if power of a signal received from a current base station is greater than a predetermined power threshold; and
    when the power of the signal received from the current base station is greater than the predetermined power threshold, determining that the probability of occurrence of the second handover is lower than a criterion.

6. The method of claim 1, wherein when the first handover is accomplished, the step of evaluating the probability of occurrence of the second handover comprises:
    determining if a ratio of power of a signal received from a current base station to power of a signal received from a neighboring base station is higher than a threshold; and
    when the ratio is higher than the threshold, determining that the probability of occurrence of the second handover is lower than a criterion.

7. The method of claim 1, wherein when the first handover is accomplished, the step of evaluating the probability of occurrence of the second handover comprises:
    determining if a serving cell quality of a current serving cell is lower than a predetermined quality threshold; and
    when the serving cell quality of the current serving cell is lower than the predetermined quality threshold, determining that the probability of occurrence of the second handover is lower than a criterion.

8. A wireless messaging method, comprising:
    determining if a first handover is accomplished;
    when the first handover is accomplished, determining if a message is transmitted successfully during the first handover;
    evaluating network conditions between a mobile station and a base station to generate an indication signal after the first handover is completed if the message is transmitted unsuccessfully during the first handover;
    when the message is not transmitted successfully, evaluating a probability of occurrence of a second handover according to the indication signal to generate a first result, and determining if it is under a moving status to generate a second result; and
    re-transmitting the message according to the first result and the second result.

9. The method of claim 8, wherein the step of retransmitting the message according to the first result and the second result comprises:
    when the first result shows the probability of occurrence of the second handover is lower than a criterion, and the second result shows not under the moving status, re-transmitting the message immediately;
    when the first result shows the probability of occurrence of the second handover is not lower than the criterion, and the second result shows not under the moving status, determining a size of the message, and re-transmitting the message according to the size of the message and a first predetermined size threshold; and
    when the first result shows the probability of occurrence of the second handover is lower than the criterion, and the second result shows under the moving status, determining the size of the message, and re-transmitting the message according to the size of the message and a second predetermined size threshold.

10. The method of claim 9, wherein:
    the step of re-transmitting the message according to the size of the message and the first predetermined size threshold comprises:
    when the size of the message is smaller than the first predetermined size threshold, re-transmitting the message immediately; and
    the step of re-transmitting the message according to the size of the message and the second predetermined size threshold comprises:

when the size of the message is smaller than the second predetermined size threshold, re-transmitting the message immediately.

11. The method of claim 8, wherein the step of evaluating the probability of occurrence of the second handover comprises:
   determining if power of a signal received from a current base station is greater than a predetermined power threshold; and
   when the power of the signal received from the current base station is greater than the predetermined power threshold, determining that the probability of occurrence of the second handover is lower than a criterion.

12. The method of claim 8, wherein the step of evaluating the probability of occurrence of the second handover comprises:
   determining if a ratio of power of a signal received from a current base station to power of a signal received from a neighboring base station is higher than a threshold; and
   when the ratio is higher than the threshold, determining that the probability of occurrence of the second handover is lower than a criterion.

13. The method of claim 8, wherein the step of evaluating the probability of occurrence of the second handover comprises:
   determining if a serving cell quality is higher than a predetermined quality threshold; and
   when the serving cell quality is higher than the predetermined quality threshold, determining that the probability of occurrence of the second handover is lower than a criterion.

14. A wireless messaging method, comprising:
   evaluating network conditions to generate an indication signal after a first handover is completed when a mobile station failed to transmit an acknowledgement signal of a successfully received message from a base station; and
   transmitting the acknowledgment signal according to the indication signal,
   wherein the step of transmitting the acknowledgment signal according to the indication signal comprises:
   determining if the first handover is accomplished;
   when the first handover is accomplished, determining if the acknowledgment signal is transmitted successfully;
   when the acknowledgment signal is not transmitted successfully, evaluating a probability of occurrence of a second handover upon the mobile station; and
   re-transmitting the acknowledgment signal according to the probability of occurrence of the second handover.

15. The method of claim 14, wherein the step of evaluating the network conditions to generate the indication signal comprises:
   evaluating the network conditions in a radio resource management sublayer to generate an evaluation result; and
   referring to the evaluation result for generating the indication signal to a short message service call management sublayer.

16. The method of claim 14, wherein the step of evaluating the probability of occurrence of the second handover upon the mobile station comprises:
   determining if power of a signal received from a current base station is greater than a predetermined power threshold; and
   when the power of the signal received from the current base station is greater than the predetermined power threshold, determining that the probability of occurrence of the second handover is lower than a criterion.

17. The method of claim 14, wherein the step of evaluating the probability of occurrence of the second handover upon the mobile station comprises:
   determining if a ratio of power of a signal received from a current base station to power of a signal received from a neighboring base station is higher than a threshold; and
   when the ratio is higher than the threshold, determining that the probability of occurrence of the second handover is lower than a criterion.

18. The method of claim 14, wherein the step of evaluating the probability of occurrence of the second handover upon the mobile station comprises:
   determining if a serving cell quality is higher than a predetermined quality threshold; and
   when the serving cell quality of the current serving cell is higher than the predetermined quality threshold, determining that the probability of occurrence of the second handover is lower than a criterion.

* * * * *